April 19, 1932.  R. J. JOROLEMON  1,855,056
DIFFERENTIAL
Filed Jan. 22, 1931   4 Sheets-Sheet 2

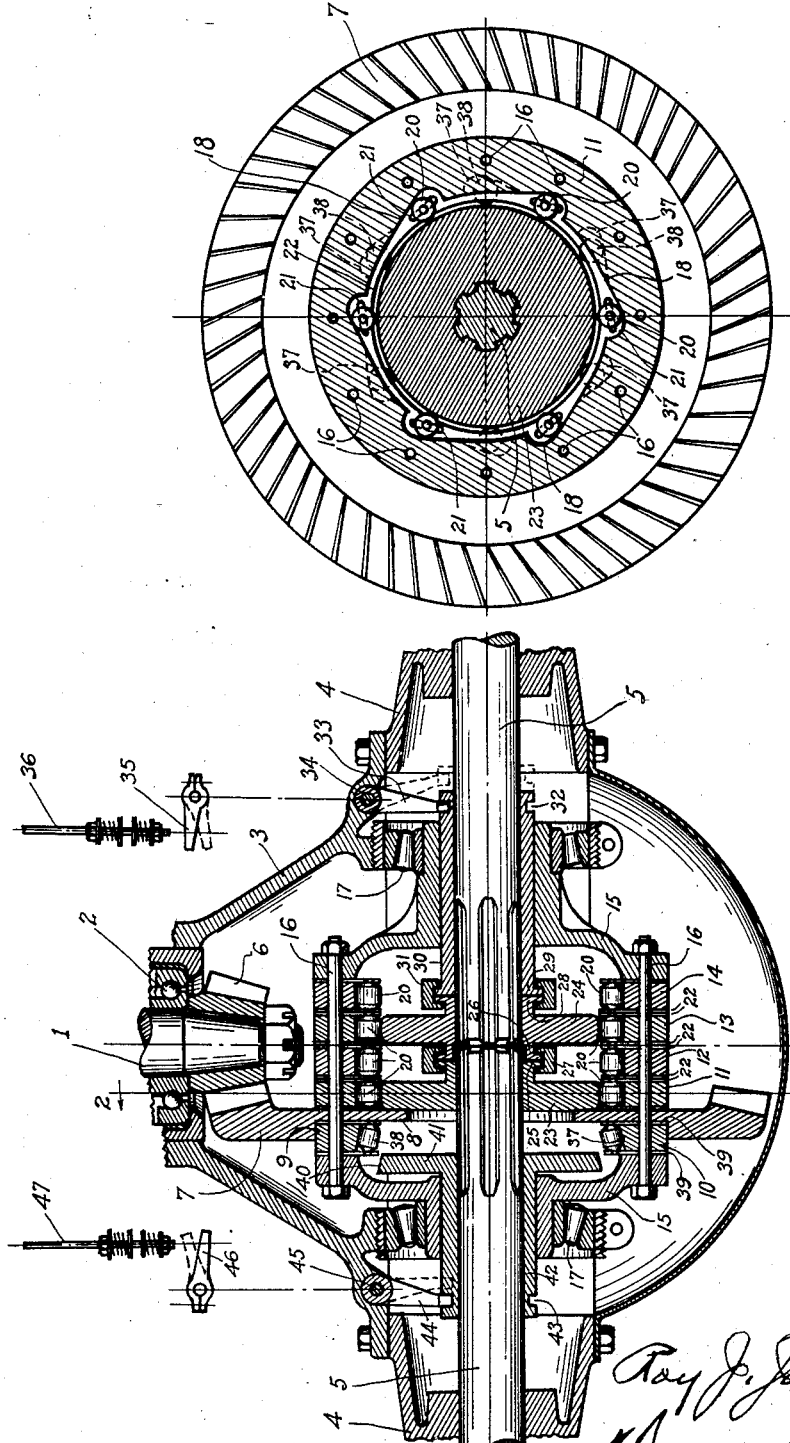

Inventor
Roy J. Jorolemon
By Vernon E. Hodges
his Attorney

April 19, 1932.   R. J. JOROLEMON   1,855,056
DIFFERENTIAL
Filed Jan. 22, 1931   4 Sheets-Sheet 3

Inventor
Roy J. Jorolemon
Vernon E. Hodges
By
Attorney

April 19, 1932. R. J. JOROLEMON 1,855,056
DIFFERENTIAL
Filed Jan. 22, 1931 4 Sheets-Sheet 4
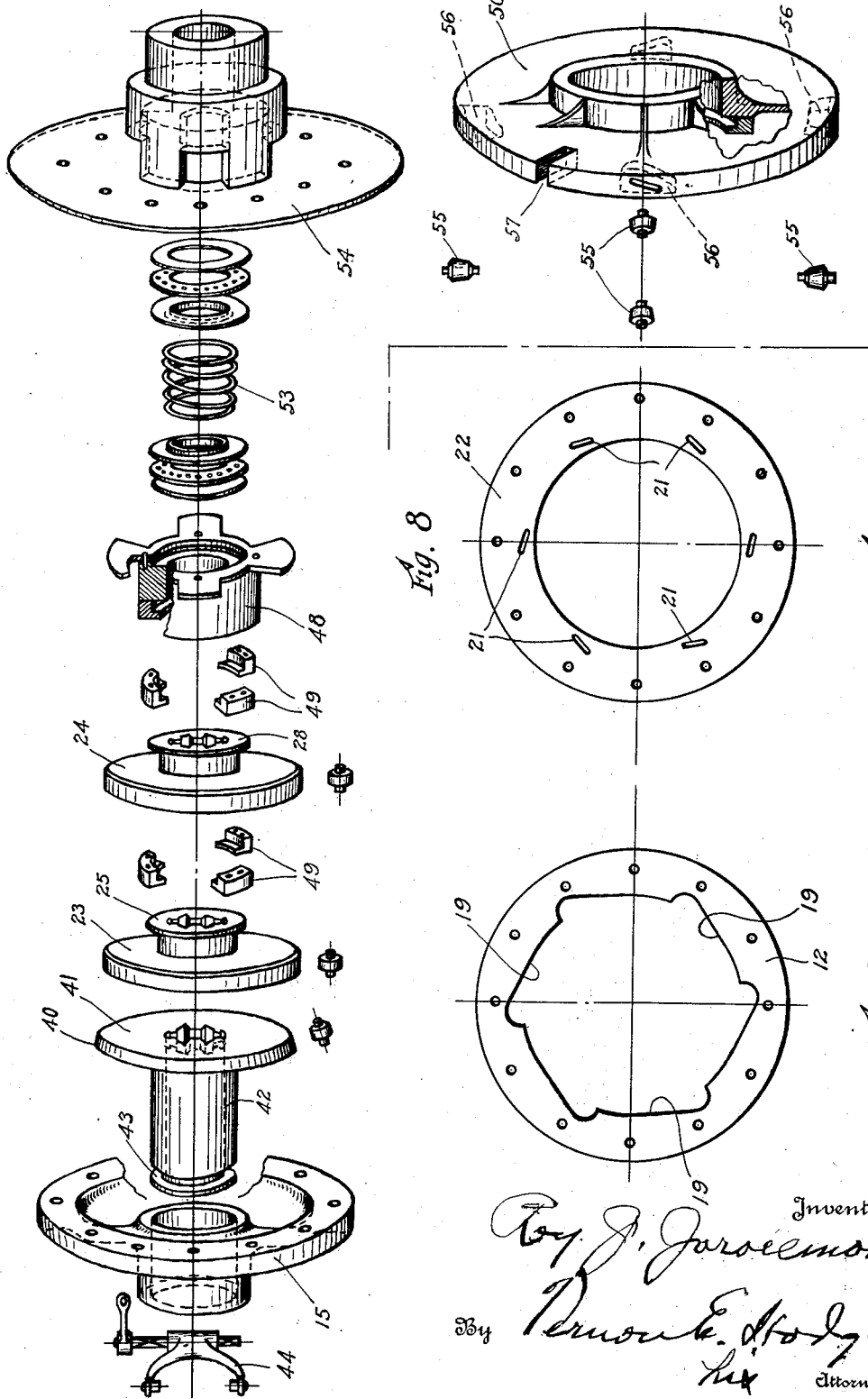

Patented Apr. 19, 1932

1,855,056

UNITED STATES PATENT OFFICE

ROY J. JOROLEMON, OF WASHINGTON, DISTRICT OF COLUMBIA

DIFFERENTIAL

Application filed January 22, 1931. Serial No. 510,560.

This invention relates to an improvement in automobile free rolling differential driving units, that will give positive power to either drive wheel, even where one wheel may be in mud or on ice, whereas with the present type of differential the car is powerless in such a case.

This unit will give free rolling in either forward or reverse direction. By "free rolling" is meant that on down grades the engine slows to an idling speed, thereby saving nearly twenty percent in operating costs, twenty percent longer life to all driving mechanism.

This mechanism is so designed that when the car is rolling, you may shift gears at will without the clashing of gears, the same as though the car were standing still.

The device eliminates all differential gears, thereby giving a quiet drive, and is not expensive to make.

The device may be constructed in either an automatic reverse action or a semi-automatic reverse control, connected to the end of transmission reverse fork shaft, so that the change is made through the present gear shift lever.

The device is so designed that the operator of the car may, at his will, use either the free rolling or positive drive, by means of a hand-control.

This device greatly reduces the hazard of skidding by means of the positive drive to both wheels,—not as with the present type when one wheel meets an obstruction or stops, the other must go twice as fast.

With the above and other objects in view, my invention consists in the novel features and in the novel combination and arrangement of parts hereinafter fully described, illustrated in the accompanying drawings forming a part of this application and particularly pointed out in the claims hereto appended.

In the accompanying drawings:

Fig. 1 is a horizontal sectional view through the differential embodying this invention;

Fig. 2 is a transverse sectional view on the line 2—2 of Fig. 1, with the housing omitted;

Fig. 8 is a disassembled perspective view of the operative parts of the differential shown in Fig. 6;

Fig. 9 is a side elevation of one of the cam rings; and

Fig. 10 is a side elevation of one of the roller cages.

Figure 3:
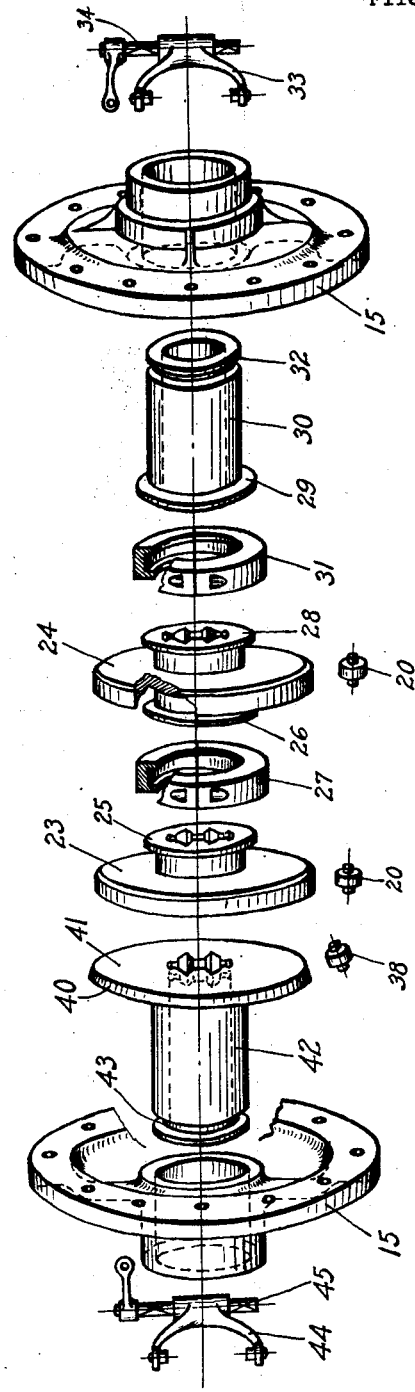
Fig. 3 is a disassembled perspective view of the operative parts of the differential.
Figure 5:
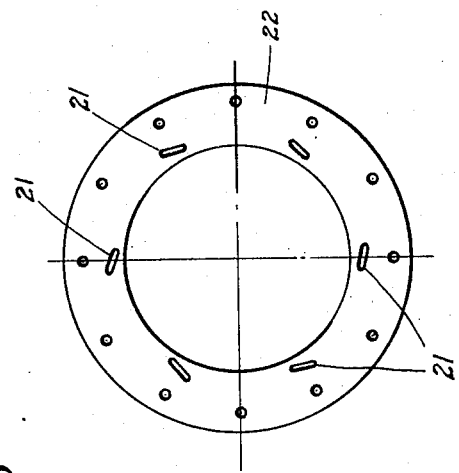
Fig. 5 is a side elevation of one of the roller cages.

The numeral 1 designates the main drive shaft mounted in bearings 2 in a differential housing 3. Axle housings 4 are connected at opposite sides of the differential housing 3 and enclose axles 5, which are adapted to be attached to the wheels of the vehicle for driving the same.

A bevel pinion 6 is fixed to the drive shaft 1 and meshes with a beveled gear 7 for transmitting power to both of the aligned axles 5. The gear 7 has a reduced portion 8, at one side of which a shoulder 9 is formed for receiving a positive drive ring 10. On the opposite sides of the reduced portion 8 are a plurality of cam rings 11, 12, 13 and 14, arranged in alignment with each other and co-axially, and on the outer sides of the positive drive ring 10 and the cam rings 11–14 are heads 15, all of which are held together and to the reduced portion 8 of the gear 7 by bolts 16, which pass therethrough as shown in Fig. 1.

Figure 4:
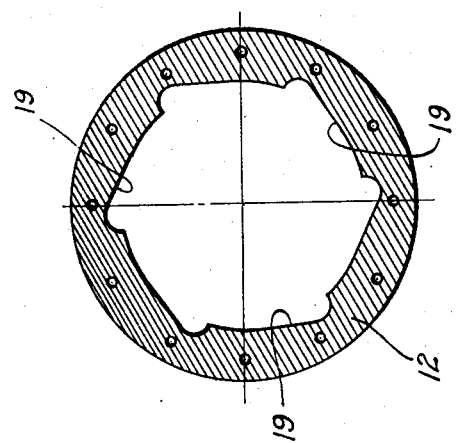
Fig. 4 is a sectional view through one of the cam rings.
Figure 7:
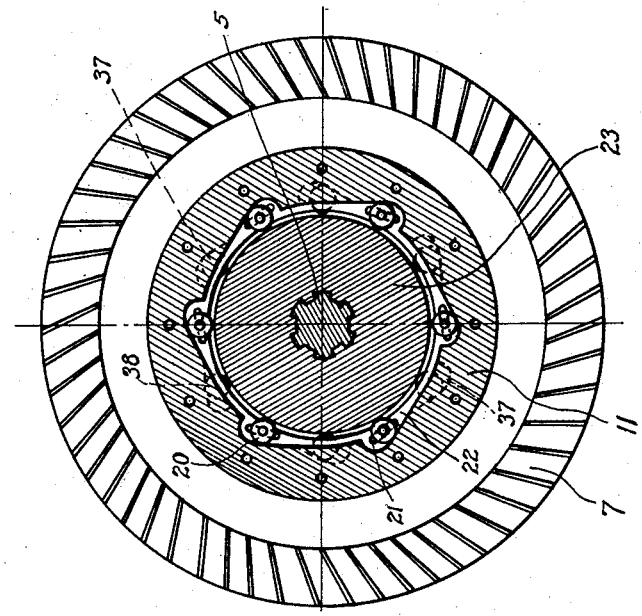
Fig. 7 is a cross-sectional view on the line 7—7 of Fig. 6, with the housing omitted.

The heads 15 are journaled in bearings 17 in the housing 3, for rotary movement with the gear 7. The cam rings 11–14 are each provided with angular cam surfaces in the inner face thereof, the rings 11 and 13 having cam surfaces 18 turned in one direction, while the cam rings 12 and 14 have angular cam surfaces 19 turned in the opposite direction, as is clearly shown in Figs. 2 and 4.

Rollers 20 engage the cam surfaces 18 and 19, and these rollers 20 are carried in slots 21 formed in roller cages 22, there being one roller cage on each side of each of the cam rings 11–14, and two cages 22 between each two of the cam rings, as shown in Fig. 1.

The rollers 20 are adapted to cooperate with sliding drivers 23 and 24, each keyed or splined on the inner end of one of the axles 5; the peripheral surfaces of the drivers 23 and 24 are round as shown in Fig. 2, so that the rollers 20 are wedged into grip engagement between the surfaces of the drivers 23 and 24 and the angular cam surfaces 18 or 19, according to the disposition of the drivers 23 and 24 within the cam rings 11–14.

The sliding driver 23 has a flange 25 on one side thereof in alignment with a flange 26 projecting from one side of the driver 24, which flanges 25 and 26 are held together by a clamp 27.

A flange 28 projects from the opposite side of the driver 24 and is secured to a flange 29 formed on a sleeve 30 by means of a clamp 31. The sleeve 30 surrounds one of the axles 5 and between said axle and the hub of the head 15. The outer end of the sleeve 30 has a groove 32 formed therein for receiving a yoke 33 mounted on a pin 34, which is provided with an arm 35 in position to be engaged by a rod 36 for operating the same, which rod may extend to a suitable control lever or to the transmission of the vehicle in order to be automatically controlled thereby.

The positive drive ring 10 has angular cam surfaces 37 therein turned in the opposite direction from the cam surfaces in the ring 11 and are beveled to receive rollers 38 carried by roller cages 39, which rollers are inclined outwardly, as shown in Fig. 1, to be engaged by the beveled peripheral surface 40 of the driving disk 41 mounted at the inner end of a sleeve 42 which surrounds one of the axles 5 and between the hub of the head 15 and said axle. The outer end of the sleeve 42 has a groove 43 therein to be engaged by a yoke 44 connected with a pin 45 mounted in the housing 3, and which pin carries an arm 46 adapted to be controlled by a rod 47, which extends to a suitable control lever for manipulation by the operator of the vehicle, or to the transmission, as may be found desirable.

The cam rings 11–14, the roller cages 22, and heads 15, constitute a driving cage, to which power is applied by the driving gear 7 from the pinion 6 and drive shaft 1.

When the sliding drivers 23 and 24 are in the position shown in Fig. 1, they will transmit power from the cam rings 11 and 13 to the axles 5 in one direction, as said cam rings are rotated from the drive shaft, by reason of the wedging engagement of the rollers 20 between the angular cam surfaces and the peripheries of the drivers 23 and 24. When, however, the speed of the wheels and axles exceeds the speed of the driving cage and its cam rings, the rollers 20 will be moved back out of wedging engagement, and the wheels and axles will roll free of the influence of the drive shaft, and without transmitting power to the drive shaft. This gives what is termed as "free rolling" or "free wheeling."

When the vehicle is driven backward, it is necessary to shift the drivers 23 and 24 into engagement with the rollers 20 for the other two cam rings 12 and 14, which have their angular cam surfaces turned in the opposite direction, so as to cause a wedging of the rollers between these angular cam surfaces and the peripheries of the drivers 23 and 24 when the cage is driven in the opposite direction by the drive shaft.

This is accomplished by the clamps 27 and 31 which connect the drivers 23 and 24 together and to the sleeve 30, which sleeve is moved lengthwise of the axis 5 by the yoke 33 as operated by the rod 35, which rod is preferably connected with one end of the transmission reverse fork shaft.

Under some circumstances, it is desirable to utilize the braking action of the vehicle engine on the wheels, and this is permitted by positively connecting the drive ring 10 of the driving cage with the axle 5 through the disk 41, which is moved into engagement with the inclined rollers 38 of the ring 10, by the rod 47 which acts on the yoke 44 to slide the sleeve 42 inward and which, in turn, moves the disk 41. This will connect the driving cage with the axle when cam rings 11 and 13 are disconnected by reason of the backward movement of the rollers 20 within the cam surfaces and will thus allow the excess speed of the axles to be transmitted to the drive shaft, or this may be accomplished by sliding the drivers 23 and 24 to the reverse positions, engaging with the rollers 20 of rings 12 and 14.

Figure 6:
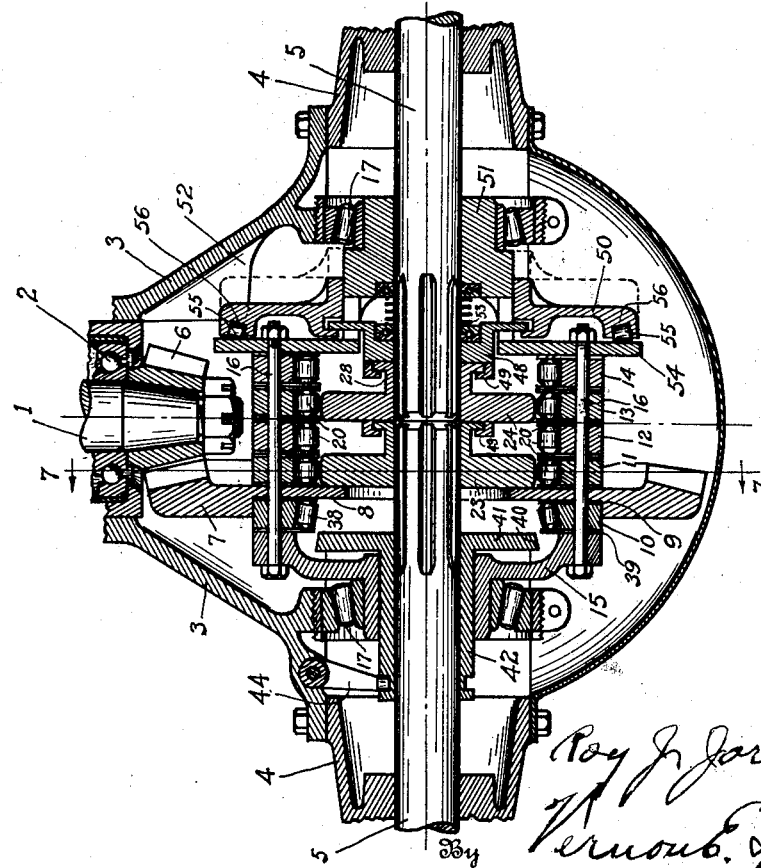
Fig. 6 is a horizontal sectional view through the differential, showing the driven elements being operated automatically.

In the modification shown in Figs. 6 and 8, the positively actuated sliding means for the disks 23 and 24 are omitted and provision is made for automatically sliding these disks into engagement with the proper cam rings, according to the direction of rotation of the drive shaft 1.

A sliding collar 48 has lugs 49 which engage the flange 28 of the driver 24, and this collar 48 is engaged by a plate 50 slidable lengthwise of the hub 51, but held against rotation by a flange 52 in the housing 3, as shown in Fig. 6, in notch 57 in plate 50, as shown in Fig. 8. A spring 53 is interposed between the hub 51 and sliding collar 48 for normally tending to move the collar and the sliding drivers in one direction. A plate 54 is connected with the cage by the bolts 16 and is engaged by radial rollers 55 mounted in cam grooves 56 in the rim of the plate 50, which grooves are shown in dotted lines in Fig. 8. The movement of drivers 23 and 24 may be regulated according to the relative disposition of the rollers 55 from the axis.

In this way, when the drive shaft 1 is reversed, it will cause the plate 54 to act on the rollers to move them forward in the cam grooves 56, thus forcing the plate 60 backward against the tension of the spring 53 and thus sliding the drivers 23 and 24 into engagement with the rollers 20 for the cam rings 12 and 14. This sliding of the drivers is thus accomplished automatically and does not require a connection between the same and the transmission.

I claim:

1. In a differential, the combination of aligned driven shafts, a driven element for driving each of said shafts and shiftable longitudinally thereof, a cage surrounding said driven elements and for driving the same, and roller clutch means between the cage and said driven elements for driving each of said driven elements in different directions when shifted to different positions.

2. In a differential, the combination of aligned driven shafts, a driven element for driving each of said shafts and shiftable longitudinally thereof, a cage surrounding said driven elements and for driving the same, roller clutch means between the cage and said driven elements for driving each of said driven elements in different directions when shifted to different positions, and means for shifting said driven elements to different positions relative to the cage to be driven in different directions.

3. In a power transmitting unit, one or more driving elements, one or more driven elements arranged coaxially of said driving elements, roller clutch means between the driving and driven elements for transmitting movement therebetween in different directions when in different positions relative to the driving elements, and means for causing shifting movement longitudinally of the axis of said elements.

4. In a power transmitting unit, one or more driving elements, a plurality of driven elements arranged coaxially of said driving elements and adapted to cooperate with different portions of said driving elements upon relative longitudinal movement, roller clutch means between the driving and driven elements for transmitting movement therebetween in different directions in different axial positions, and means for causing relative shifting movement of said elements longitudinally of the axis thereof.

5. In a power transmitting unit, a driving cage, a plurality of driven elements arranged coaxially within said cage and adapted to cooperate with different portions thereof upon relative longitudinal shifting movement, roller clutch means between the cage and the driven elements for transmitting movement from the cage to the driven elements in different directions in different axial positions, and means for causing relative shifting movement of the cage and driven elements longitudinally of the axis thereof.

6. In a power transmitting unit, a driving cage, a plurality of driven elements arranged coaxially within said cage and adapted to be operatively connected with different portions thereof upon longitudinal shifting movement, roller clutch means between the cage and the driven elements for transmitting movement from the cage to the driven elements in opposite directions in different axial positions, and means for shifting the driven elements longitudinally of the axis thereof and relative to the cage.

7. In a differential, the combination of aligned driven shafts, a driven element for driving each of said shafts, a plurality of cam rings surrounding and enclosing said driven elements, and having cam surfaces arranged in different directions, roller elements arranged in position to wedge in grip engagement between the cam surfaces and the driven elements, and means for shifting the driven elements longitudinally of the driven shafts to drive said shafts in different directions.

8. In a differential, the combination of aligned driven shafts, a driven element for driving each of said shafts, a plurality of cam rings surrounding and enclosing said driven elements, and having cam surfaces arranged in different directions, roller cages associated with said cam rings and having roller elements arranged in position to wedge in grip engagement between the cam surfaces and the driven elements, means for securing the cam rings together against relative movement, means for shifting the driven elements longitudinally of the driven shafts to drive said shafts in different directions, bevel gears fixed to the cam rings, and a drive shaft operatively connected with said gears.

9. In a differential, the combination of aligned driven shafts, a driven element for driving each of said shafts, a plurality of cam rings surrounding and enclosing said driven elements, and having cam surfaces arranged in different directions, roller elements arranged in position to wedge in grip engagement between the cam surfaces and the driven elements, means for shifting the driven elements longitudinally of the driven shafts to drive said shafts in different directions, a positive drive ring fixed to said cam rings, rollers connected with said drive ring and having the contacting surfaces thereof tilted outwardly, a secondary driven element slidably fixed to at least one driven shaft and in position to engage the last-mentioned rollers, and means for shifting said secondary driven element into wedging engagement with said rollers.

10. In a power transmitting unit, the combination of a driving cage, one or more driven elements operatively connected therewith and adapted to be driven in different directions upon longitudinal movement relative to the cage, a sliding collar connected with the driven elements, a plate connected with said collar for actuating the same, and cam actuated means connected with the plate for automatically sliding the driven elements relative to the cage.

11. In a power transmitting unit, the combination of driven shafts, one or more driven elements for driving said shafts, a driving element for said driven elements, a secondary driven element fixed to at least one of the shafts, and a secondary driving element connected with the first-mentioned driving element for driving said secondary driven element.

12. In a power transmitting unit, the combination of driven shafts, one or more driven elements for driving both of said shafts, one or more driving elements for said driven elements, a secondary driven element fixed to one of the shafts, a secondary driving element connected with the first-mentioned driving elements for driving said secondary driven element, and means for causing clutching engagement between the secondary driving and driven elements.

13. In a power transmitting unit, the combination of driven shafts, one or more driven elements for driving both of said shafts, one or more driving elements for said driven elements, a secondary driven element fixed to one of the shafts, a secondary driving element for driving said secondary driven element, and roller clutch means between the secondary driving and driven elements.

14. In a power transmitting unit, the combination of driven shafts, one or more driven elements for driving both of said shafts, one or more driving elements for said driven elements, a secondary driven element fixed to one of the shafts, a secondary driving element for driving said secondary driven element, roller clutch means between the secondary driving and driven elements, and means for causing relative axial shifting movement between the secondary driving and driven elements to cause engagement of the roller clutch means.

In testimony whereof I affix my signature.

ROY J. JOROLEMON.